United States Patent [19]
Gipperich

[11] Patent Number: 5,564,472
[45] Date of Patent: Oct. 15, 1996

[54] REINFORCED FLEXIBLE CORRUGATED TUBING

[75] Inventor: William C. Gipperich, Sterling Heights, Mich.

[73] Assignee: Handy and Harman Automotive Group, Inc., Auburn Hills, Mich.

[21] Appl. No.: 178,691

[22] Filed: Jan. 10, 1994

[51] Int. Cl.$^6$ .................................................. F16L 11/15
[52] U.S. Cl. ........................... 138/121; 138/172; 138/177
[58] Field of Search ..................................... 138/121, 119, 138/DIG. 4, 177, 110, 172

[56] References Cited

U.S. PATENT DOCUMENTS

| | | |
|---|---|---|
| 881,770 | 3/1908 | Boyd . |
| 954,673 | 4/1910 | Felker . |
| 973,708 | 10/1910 | Schlafly . |
| 1,052,709 | 2/1913 | Badger . |
| 1,336,111 | 4/1920 | Ullrich . |
| 1,971,928 | 8/1934 | Zallea ......................................... 285/90 |
| 2,524,662 | 10/1950 | Harding . |
| 2,573,530 | 10/1951 | Zallea et al. ................................ 29/148 |
| 3,578,777 | 5/1971 | DeGain ....................................... 138/121 |
| 3,605,817 | 9/1971 | Bauman et al. ............................ 138/121 |
| 3,715,454 | 2/1973 | Kleykamp ..................................... 174/47 |
| 3,785,290 | 1/1974 | Castor et al. .............................. 138/121 |
| 3,842,865 | 10/1974 | Torricelli .................................... 138/121 |
| 4,592,231 | 6/1986 | Kant ........................................... 138/121 |
| 4,758,455 | 7/1988 | Campbell et al. ............................ 428/36 |
| 4,791,963 | 12/1988 | Gronert et al. ............................ 138/110 |
| 4,811,761 | 3/1989 | Huvey ......................................... 138/122 |
| 5,148,836 | 9/1992 | Lawrence .................................... 138/121 |

*Primary Examiner*—Frankie L. Stinson
*Assistant Examiner*—James F. Hook
*Attorney, Agent, or Firm*—Pennie & Edmonds

[57] ABSTRACT

A reinforced flexible corrugated tube comprising a plurality of corrugations and connecting members for connecting each of said corrugations for reinforcement of same, wherein the first pair and last pair of corrugations are each connected by at least one connecting member, and all other corrugations are connected by at least one first and at least one second connecting member, with the first connecting members being offset with respect to the second connecting members.

37 Claims, 2 Drawing Sheets

REINFORCED FLEXIBLE CORRUGATED TUBING

FIELD OF THE INVENTION

This invention relates to extruded corrugated tubing, which may be used to convey liquids or gases, or a mixture of fluids and solids, or to provide conduit for smaller tubes, wires, etc. This tubing is reinforced to compensate for the change in longitudinal length caused by the temperature of the ambient environment and/or the internal temperature of the corrugated tubes.

BACKGROUND OF THE INVENTION

Common corrugated tubing is generally known in the prior art. U.S. Pat. No. 1,971,928 to Zallea teaches a common corrugated tube with rings attached to the tube at the grooves and with links connecting the rings. U.S. Pat. No. 3,578,777 to DeGain discloses a corrugated tube with variable diameters and longitudinally extending ribs. U.S. Pat. No. 3,715,454 to Kleykamp teaches a flexible corrugated vacuuming tube having a long channel running along the length of the tube with a reinforcing member affixed thereto. Further, U.S. Pat. No. 4,791,963 to Gronert et al. discloses a corrugated tube with longitudinal supports mounted on a set of rings.

While these devices are useful for their intended purposes, it has been found that when corrugated tubing is placed in an environment that experiences heat, such as an air conduit for an automobile engine, the tube can expand due to the heat and lose its configuration. This causes the tubing to sag, buckle or otherwise depart from its intended position. None of the previous devices is capable of overcoming this problem. Thus, there remains a need for corrugated tubing which can maintain its configuration in such environments.

SUMMARY OF THE INVENTION

The present invention resolves the deficiencies of the prior art by providing a novel reinforced flexible corrugated tube comprising at least first, second and third corrugations and means for connecting said corrugations for reinforcement of same, wherein the connecting means comprises at least one first member for connecting the first and second corrugations, and at least one second member for connecting the second and third corrugations, with the first connecting member being offset with respect to the second connecting member.

Further, another embodiment of the reinforced flexible corrugated tube may also comprise at least first, second, third and fourth corrugations, and means for connecting said corrugations for reinforcement of same, wherein the connecting means comprises at least one first member for connecting the first and second corrugations, at least one second member for connecting the second and third corrugations, and at least one third member for connecting the third and fourth corrugations, with first and third connecting members being offset with respect to the second connecting member.

Also, another embodiment may comprise a plurality of corrugations and means for connecting each of said corrugations for reinforcement of same, wherein the first pair and last pair of corrugations are each connected by at least one connecting member, and all other corrugations are connected by at least one first and at least one second connecting member, with the first connecting members being offset with respect to the second connecting members.

In the embodiments described above, first and second corrugations may be connected by two first connecting members, and second and third corrugations are connected by two second connecting members wherein this pattern is repeated along all the corrugations. The first and second members may be offset by at least 10 degrees, preferably at least 60 degrees and even more preferably by about 90 degrees. Further, the connecting members may be positioned at least 30 degrees from each other on the circumference of the corrugations, and preferably 90 degrees from each other. Alternatively, three first members may connect first and second corrugations and three second members connect second and third corrugations wherein this pattern is repeated along all the corrugations. In this design, the first and second members may be offset by at least 45 degrees and preferably by 60 degrees. The three connecting members are advantageously positioned at least 30 degrees from each other on the circumference of the corrugations.

Further, in these embodiments, the connecting members may be ribs which are formed integral with the tube or which are manufactured separately and then adhered or attached onto the corrugations. These connecting members or ribs may also be constructed from a material that has a lower coefficient of thermal expansion than that of the tube, with the length of each being less than the spacing between the corrugations.

DETAILED DESCRIPTION OF THE PREFERRED EMBODIMENTS

Figure 1:
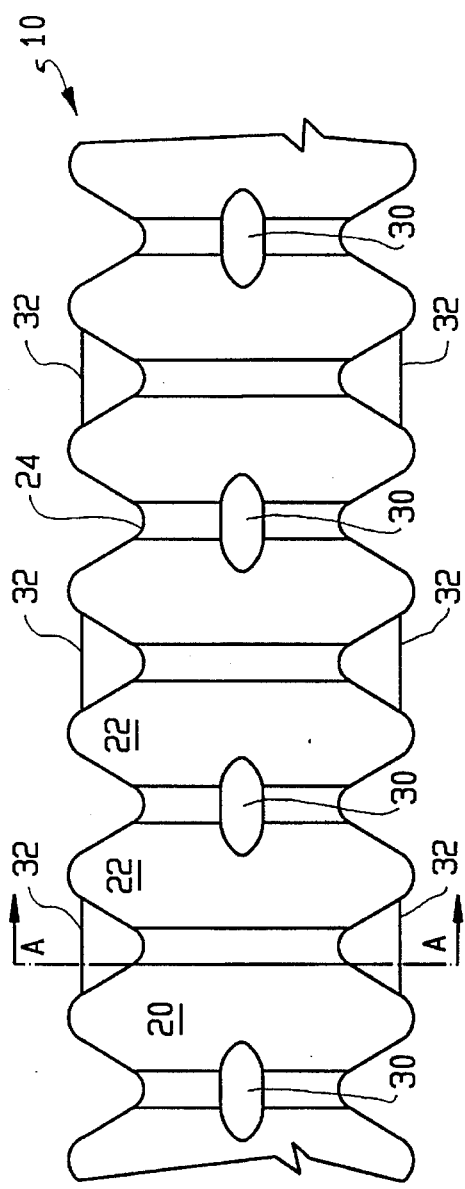
FIG. 1 is a side view of an embodiment of the improved corrugated tube showing the corrugations and the offsetting ribs.

According to the present invention, a novel corrugated tube is provided wherein at least one rib connects adjacent corrugations. Such rib (or ribs) can be located anywhere on the periphery of the corrugations, and in such a way that the rib provides longitudinal support for the tube by limiting the amount of longitudinal expansion. A novel feature of this invention is that this rib is not aligned with any of the ribs connecting adjacent corrugations. This offsetting feature provides the tube with flexibility when subjected to bending forces, and with an added advantage of being sufficiently flexible to be able to bend around corners. For example, the locations of the offsetting ribs can be limited to one-half or one quarter of the circumference or periphery of the tube. Such an alignment gives the tube strength on one side and flexibility on other sides.

Furthermore, the ribs can be rigid or flexible. When the ribs are subjected only to tensile stress, they can also be made out of string, rope, cord or wire and may be integral with the tube or may be adhered or attached onto the surfaces of the corrugations.

Also, the corrugations may have any shape. In the preferred embodiments described below and in the drawings, the corrugations shown have sinusoidal shape. However, the corrugations may have square, triangular or any other shapes, if desired.

Referring now to the drawings wherein like reference numerals are used to designate like parts and according to FIG. 1, a preferred embodiment of the corrugated tube 10 comprises a plurality of corrugations 20. At least three corrugations 20 are used according to the present invention. Corrugations 20 are connected together in such a way as to form peaks 22 and grooves 24. Adjacent corrugations 20 are further connected by ribs 30 and 32. A two-rib embodiment of the present invention is shown in FIG. 1. Except for the first and last corrugations, each pair of corrugations 20 is connected by two pairs of ribs 30, 32 wherein the ribs 30 and 32 respectively are positioned 180 degrees apart. The ribs 30 are offset 90 degrees or one-quarter of a revolution from the ribs 32. However, all pairs of ribs 30 are aligned and all pairs of ribs 32 are aligned. The offsetting feature of the present invention is further shown in FIG. 2, where a pair of ribs 30 is shown together with an adjacent pair of ribs 32 drawn in phantom.

Figure 2:
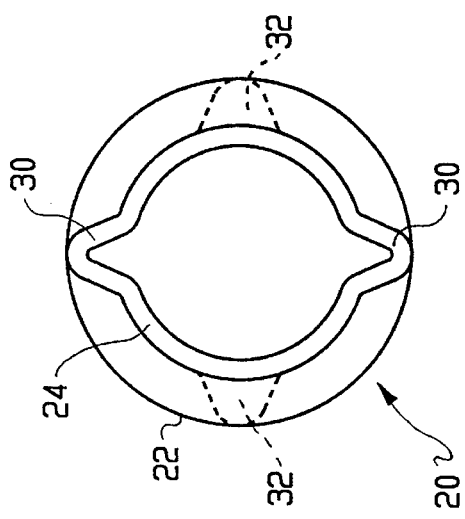
FIG. 2 is the cross-sectional view taken along line A—A of the embodiment shown in FIG. 1.
Figure 3:
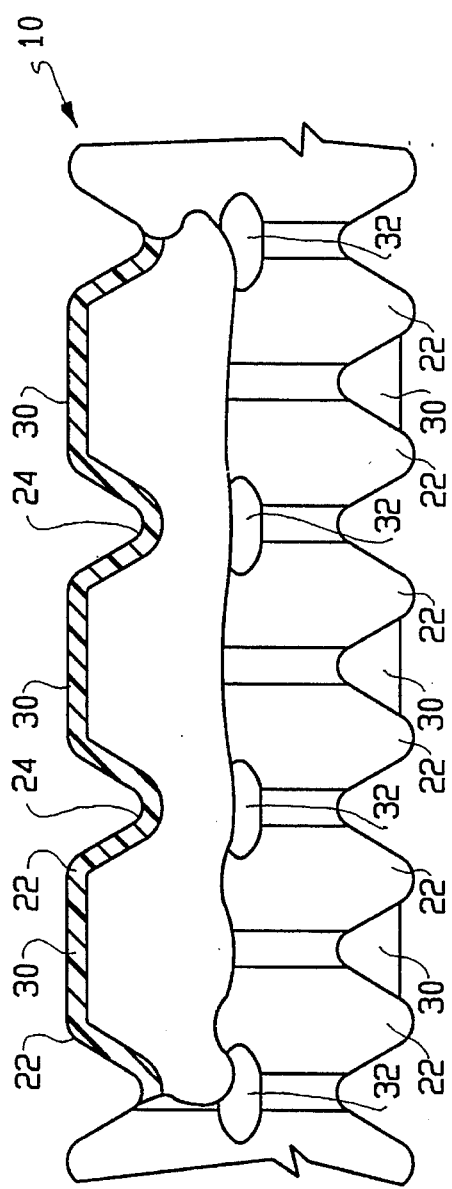
FIG. 3 is the side view with the top-half shown in cut-out view of the embodiment shown in FIG.1.

Further, ribs 30 may be integral parts of corrugated tube 10 as shown in FIGS. 2 and 3. Ribs 30 rise from groove 24 and connect adjacent peaks 22. FIG. 3 further shows that ribs 30 are integral parts of tube 10, where ribs 30 connect adjacent peaks 22. This embodiment can be manufactured during the extrusion or forming process, where the corrugations and the ribs are formed by pushing heated thermoplastic material through a die which contains an aperture. Also the ribs and corrugations can be formed by blow molding or vacuum forming technique where a mold or a model of the reinforced corrugated tube is made and heated material is forced into the mold. These manufacturing techniques are known to those skilled in the art.

Figure 4:
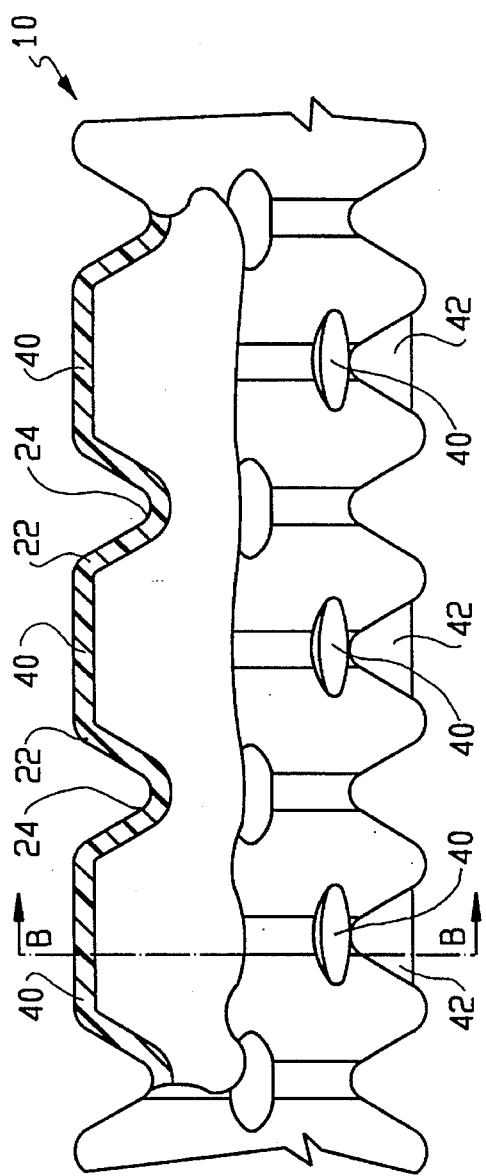
FIG. 4 is the side view with the top-half shown in cut-out view of another embodiment of the present invention.
Figure 5:
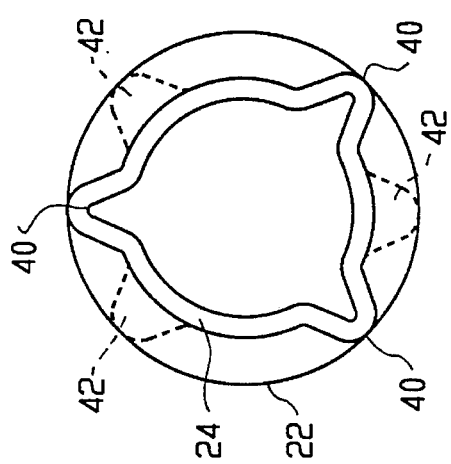
FIG. 5 is the cross-sectional view taken along line B—B of the embodiment shown in FIG. 4.
Figure 6:
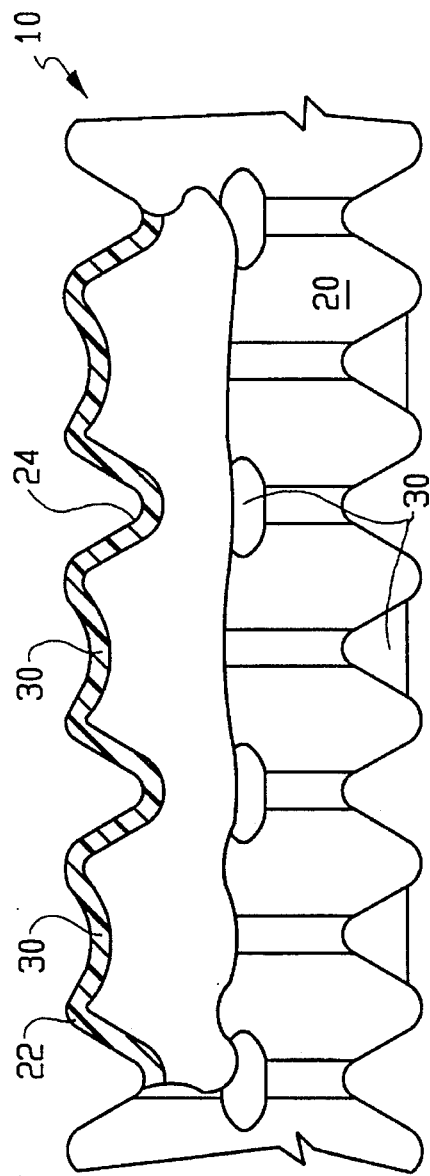
FIG. 6 is the side-view with the top-half shown in cut-out view of yet another embodiment of the present invention.

A three-rib embodiment the present invention is shown in FIGS. 4 and 5. A set of three ribs 40 connects a first pair of adjacent corrugations 20 and a second set of three ribs 42 connects a second pair of adjacent corrugations 20. The ribs 40, 42 respectively are located 120 degrees apart, and ribs 40 are offset 60 degrees or one-sixth of a revolution from ribs 42. Similar to the two-rib embodiment, all sets of ribs 40 are aligned, and all sets of ribs 42 are aligned.

Still another embodiment of the present invention has a first set of four ribs (not shown) connecting adjacent corrugations, wherein the ribs respectively are located 90 degrees apart and a second set of ribs which are also located 90 degrees apart but are offset 45 degrees or one-eighth of a revolution from the ribs of the first set. Similar to the embodiments described above, all first sets of ribs are aligned, and all second sets of ribs are aligned. The invention contemplates additional arrangements of multiple ribs in the first and second sets wherein the sets can be offset at any angle.

Yet another embodiment of the present invention is shown in FIG. 3, where the depth of ribs 30 is varied to limit or control thermal expansion. As shown, the length of the ribs is less than the spacing between corrugations 20, which is the distance between peaks 22. The advantage of this embodiment is to provide corrugated tube 10 with even more flexibility.

It should also be noted that not every corrugation has to be reinforced or connected. Thus, ribs 30 may connect a first pair of corrugations 20 across one groove 24, and ribs 32 connect a second pair of corrugations 20 across the adjacent groove 24, or ribs 32 may connect another second pair of corrugations 20 across a non-adjacent groove 24. It should also be noted that the alignment of ribs 30 or 32 can also occur in any frequency, e.g. every other pair, or every other three or four pairs, or not aligned at all. Further, ribs 30 and 32 can be located anywhere on the circumference of the corrugations, as long as they are at least 30 degrees apart.

An advantage of the present invention is that any combination of the above described embodiments can be used in or adapted to any application. For example, if tube 10 has to be flexible at one or more portions while being rigid at the other portions. The present invention can easily accommodate this configuration by providing the two, three or four-rib embodiment where rigidity is required, and where flexibility is required the corrugations may be connected by only one rib and these ribs would be restricted to only one portion of the circumference of the tube. This alignment is particularly helpful when the tube has to conform to sharp bends. In other words, the reinforced flexible corrugated tube according to the present invention may combine one or more embodiments described above to conform to any particular application.

Corrugated tube 10 can be constructed out of any commercially available materials, such as rubber, plastics or aluminum or other metals, and it can have any diameter. The tube may be straight or arcuate or any other shape. Also, the tube can take on any form due to its flexibility.

Further, when a great amount of flexibility as well as high tensile strength is required, the ribs can be constructed from flexible materials, such as rope, string, cord or wire, preferably those that have coefficients of thermal expansion lower than that of the material of the tube. In this embodiment, the flexible ribs do not expand as fast as the corrugated tube as the difference between the temperature of the ambient environment and the internal temperature of the tube increases, and thereby control longitudinal expansion. This preferred embodiment is capable of withstanding the stress when the corrugations try to expand.

While various embodiments of the present invention are described above, it is understood that various features of the preferred embodiments can be used singly or in any combination thereof. For example, in certain applications the same number of ribs do not have to be used in the first and second sets. In fact, not every rib needs to be offset. It is only necessary that at least one or two ribs, depending upon the number used, from each set be offset. Although all ribs are offset in the most preferred designs. Therefore, this invention is not to be limited to only the specifically preferred embodiments depicted herein.

What is claimed is:

1. A reinforced flexible corrugated tube comprising at least first, second and third corrugations each having an apex and front and rear sidewalls and means for connecting said corrugations for reinforcement of the same, wherein the connecting means comprises a plurality of separate connecting members including at least one first member affixed to the rear sidewall of the first corrugation and to the front sidewall of the second corrugation, and at least one second member affixed to the rear sidewall of the second corrugation and to the front sidewall of the third corrugation, with the first connecting member being circumferentially offset with respect to the second connecting member.

2. The tube as set forth in claim 1, wherein the first corrugation is immediately adjacent the second corrugation and the second corrugation is immediately adjacent the third corrugation, and further wherein at least two first and two second connecting members are present on the second corrugation.

3. The tube as set forth in claim 2, wherein the first and second connecting members are offset by at least about 10 degrees.

4. The tube as set forth in claim 3, wherein each first and second connecting member is positioned at least about 30 degrees from an adjacent connecting member about the circumference of the second corrugation.

5. The tube as set forth in claim 4, wherein the first connecting members are positioned 180 degrees from each other on the circumference of the second corrugation.

6. The tube as set forth in claim 5, wherein the first and second connecting members alternate about the circumference of the second corrugation, wherein the second connecting members are offset to the first connecting members by at least about 60 degrees.

7. The tube as set forth in claim 6, wherein adjacent first and second connecting members are each offset by about 90 degrees.

8. The tube as set forth in claim 2, wherein at least three first and three second members are present on the second corrugation, with each connecting member positioned at least about 30 degrees from an adjacent connecting member about the circumference of the second corrugation.

9. The tube as set forth in claim 8, wherein the first and second connecting members alternate about the circumference of the second corrugation and are offset by at least about 45 degrees.

10. The tube as set forth in claim 9, wherein each connecting member on the second corrugation is offset by about 60 degrees from each adjacent connecting member.

11. The tube as set forth in claim 1, wherein the connecting members contact the sidewalls of the corrugations at or near the apex thereof.

12. The tube as set forth in claim 1 wherein adjacent corrugations are separated by a groove.

13. The tube as set forth in claim 12 wherein the length of each connecting member is greater than the width of each groove.

14. The tube as set forth in claim 1, wherein the length of each connecting member is less than the spacing between the corrugations.

15. A reinforced flexible corrugated tube comprising at least first, second and third corrugations and means for connecting said corrugations for reinforcement of same, wherein the connecting means comprises a plurality of separate connecting members including at least one first member affixed to the first and second corrugations, and at least one second member affixed to the second and third corrugations, with the first connecting member being circumferentially offset with respect to the second connecting member, wherein each connecting member is constructed from a material that has a lower coefficient of thermal expansion than that of the tube for restricting longitudinal thermal expansion of the tube.

16. A reinforced flexible corrugated tube comprising at least first, second, third and fourth corrugations each having an apex and front and rear sidewalls and means for connecting said corrugations for reinforcement of same, wherein the connecting means comprises a plurality of separate connecting members including at least one first member affixed to the rear sidewall of the first corrugation and to the front sidewall of the second corrugation, at least one second member affixed to the rear sidewall of the second corrugation and to the front sidewall of the third corrugation, and at least one third member affixed to the rear sidewall of the third corrugation and to the front sidewall of the fourth corrugation, with the first and third connecting members being circumferentially offset with respect to the second connecting member to permit bending flexibility while limiting longitudinal expansion.

17. The tube as set forth in claim 16, wherein the first corrugation is adjacent to the second corrugation, and the second corrugation is adjacent to the third corrugation and the third corrugation is adjacent to the fourth corrugation, and wherein at least two first and two second connecting members are present on the second corrugation and said at least two second and at least two third connecting members are present on the third corrugation.

18. The tube as set forth in claim 17, wherein each first and second connecting member is positioned at least 30 degrees from an adjacent connecting member about the circumference of the second corrugation, and wherein each second and third connecting member is positioned at least 30 degrees from an adjacent member about the circumference of the third corrugation.

19. The tube as set forth in claim 18, wherein the first connecting members are positioned 180 degrees from each other on the circumference of the second corrugation, and wherein the second connecting members are positioned 180 degrees from each other on the circumference of the third corrugation, wherein the first and third connecting members are aligned.

20. The tube as set forth in claim 19, wherein the first and second connecting members alternate about the circumference of the second corrugation and the second and third connecting members alternate about the circumference of the third corrugation, wherein the first and second connecting members are offset by at least about 60 degrees and the second and third connecting members are offset by at least 60 degrees.

21. The tube as set forth in claim 20, wherein the first and second connecting members are offset by about 90 degrees.

22. The tube as set forth in claim 16 wherein at least three first and at least three second connecting members are present on the second corrugation and said at least three second connecting members and at least three third connecting members are present on the third corrugation, wherein each first and second connecting member is positioned at least about 30 degrees from an adjacent connecting member about the circumference of the second corrugation and wherein each second and third connecting member is positioned at least about 30 degrees from an adjacent connecting members about the circumference of the third corrugation.

23. The tube as set forth in claim 22, wherein the first and second connecting members alternate about the circumference of the second corrugation and are offset by at least 45 degrees, and wherein the second and third connecting members alternate about the circumference of the third corrugation and are offset by at least 45 degrees.

24. The tube as set forth in claim 23, wherein each connecting member on the second and third corrugations is offset by about 60 degrees from each adjacent connecting member, and wherein the first and third connecting members are aligned.

25. The tube as set forth in claim 16, wherein each connecting member is constructed from a material that has a lower coefficient of thermal expansion than that of the tube for restricting longitudinal thermal expansion of the tube.

26. A reinforced flexible corrugated tube comprising a plurality of corrugations each having an apex and front and rear sidewalls and means for connecting each of said corrugations for reinforcement of same, comprising a plurality of separate connecting members, wherein the first pair and last pair of corrugations are each connected by at least one connecting member affixed thereto, with the rear sidewall of one corrugation connected to the front sidewall of the other corrugation in each pair, and wherein the front and rear sidewalls of all other corrugations are connected by at least one first and at least one second connecting member which are affixed thereto, respectively, with the first connecting members being circumferentially offset with respect to the second connecting members to permit bending flexibility while limiting longitudinal expansion.

27. The tube as set forth in claim 26, wherein the corrugations are immediately connected and wherein at least two first connecting members and at least two second connecting members are present on the second corrugation, wherein said at least two second connecting members and at least two third connecting are present on the third corrugation, wherein a pattern of at least two even-numbered connecting members and at least two odd-numbered connecting members are present on each corrugation is repeating along all the corrugations.

28. The tube as set forth in claim 27, wherein the even and odd connecting members are offset by at least about 10 degrees.

29. The tube as set forth in claim 28, wherein each odd and even connecting member is positioned at least about 30 degrees from an adjacent connecting member about the circumference of each corrugation.

30. The tube as set forth in claim 29, wherein the even and odd connecting members alternate about the circumference of each corrugation and wherein the even and odd connecting members are offset from each other by at least about 60 degrees.

31. The tube as set forth in claim 30, wherein the odd and even connecting members are positioned respectively 180° from each other on the circumference of each corrugation.

32. The tube as set forth in claim 31, wherein the odd-numbered connecting members are aligned, the even-numbered connecting members are aligned, and the even connecting members are offset from the odd connecting members by about 90 degrees.

33. The tube as set forth in claim 26, wherein the pattern comprises at least three even-numbered connecting members and at least three odd-numbered connecting members are present on each corrugation with each connecting member positioned at least about 30 degrees from an adjacent connecting member about the circumference of each corrugation.

34. The tube as set forth in claim 33, wherein the odd and even connecting members alternate about the circumference of each corrugation and are offset by at least about 45 degrees.

35. The tube as set forth in claim 34, wherein the odd and even connecting members are offset by about 60 degrees from each adjacent connecting members, and each connecting member is formed integral with the tube.

36. The tube as set forth in claim 26, wherein each connecting member is constructed from a material that has a lower coefficient of thermal expansion than that of the tube for restricting longitudinal thermal expansion of the tube.

37. The tube as set forth in claim 26 wherein the length of each connecting member is less than the spacing between the corrugations.

\* \* \* \* \*